June 2, 1970

D. YEROUCHALMI 3,515,913

ELECTRICALLY AND THERMALLY INSULATING ELEMENTS FOR
MAGNETOHYDRODYNAMIC ENERGY-CONVERSION DUCT

Filed Nov. 28, 1967

United States Patent Office 3,515,913
Patented June 2, 1970

3,515,913
ELECTRICALLY AND THERMALLY INSULATING ELEMENTS FOR MAGNETOHYDRODYNAMIC ENERGY-CONVERSION DUCT
David Yerouchalmi, Le Mesnil-St.-Denis, France, assignor to Commissariat a l'Energie Atomique, Paris, France
Filed Nov. 28, 1967, Ser. No. 686,245
Claims priority, application France, Dec. 16, 1966, 87,889
Int. Cl. H02n 4/02
U.S. Cl. 310—11
2 Claims

ABSTRACT OF THE DISCLOSURE

Electrically and thermally insulating elements for walls and spacers of a MHD energy-conversion duct and comprising a casing of heat-conducting material which is equipped with cooling passages and provided on one face with metallic partitions between which are fitted bricks of ceramic insulating material, the partitions being adapted to extend into the cooling passages. The elements additionally comprise a plate of ceramic insulating material which is subjacent to the bricks and provides a separation between the bricks and the casing, as well as sleeves of ceramic insulating material which provide a separation between the partitions and the casing.

---

Figure 1:
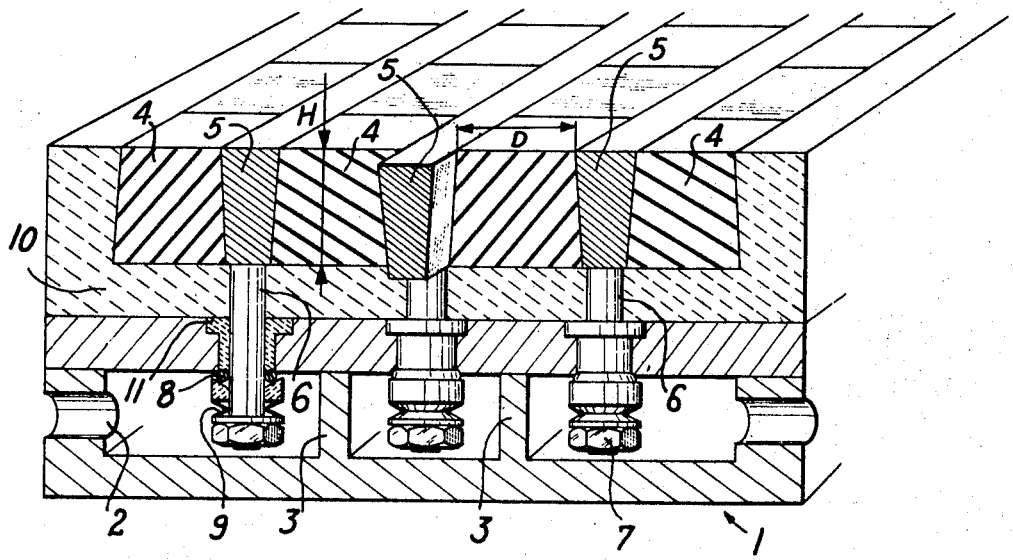

This invention relates to electrically and thermally insulating elements which can perform the function of walls or electrode spacers for a magnetohydrodynamic energy-conversion duct.

Some generators which produce electric power by magnetohydrodynamic effect (hereinafter designated as MHD) and operate on the open-cycle principle comprise a duct of rectangular cross-section in which the combustion gases which are heated to 2400–2700° C. by super-oxidation or by addition of secondary air at high temperature are ionized by alkali-metal seeding material and thus acquire an electrical conductivity of the order of 10 to 40 mhos/m. These seeded gases circulate at velocities of approximately 700 to 800 m./s. in an intense magnetic field (higher than 2 Teslas) which is normal to two opposite duct walls which must be electrically insulating. Said gases generate an electric current which is substantially perpendicular to their direction of displacement as well as to the direction of the magnetic field, in accordance with Laplace's law. This electric current can be collected in an external load circuit, provided that the two remaining and opposite walls of the duct are electrically conducting and that the electric contact between the hot seeded gases and the frontal face of the electrode takes place without any appreciable voltage drop. Said conducting walls (or electrodes) are usually made up of insulating plates (spacers) and electrically-conducting plates arranged in alternate sequence.

The electrodes are sufficient as soon as their electrical conductivity attains 50 to 100 mhos/m. as well as good electron emissivity whilst the plates of the insulating walls and the electrode spacers must not exceed the value of 1 mho/meter in operation. Beyond this value, leakage currents are established in the partially insulating materials and give rise to voltage drops at the expense of the energy which is generated by MHD conversion.

In order to construct a plate element for the insulating wall or electrode spacer of an MHD conversion duct, recourse is usually had either to bricks or to metallic tubes which are cooled by an internal circulation of water, or to electrically insulating refractory oxides.

In the first case, the bricks or tubes are electrically insulated with respect to each other by means of variable thicknesses of ceramic insulating materials whereas the continuity of the water circulation systems is ensured by means of couplings formed of different plastic insulating materials. At first sight, this solution appears to avoid the difficulties which are inherent in high temperature operation (pyroscopic resistance to thermal shock and to erosion) whereas, in practice, it suffers from many disadvantages. In fact, the metallic surfaces are protected only for a very short time against corrosive attack by the alkali-metal seeding material which liquefies in contact with these cold surfaces. However, it is chiefly the insulating joints of ceramic material which become impregnated with the seeding material and, after a period of the order of 1 to 5 hours, lose their insulating properties. Objectionable leakage currents are thus established in the insulating walls or the spacer plates and are attended by voltage drops.

In the second case, when electrically insulating refractory oxides are employed for the purpose of forming the walls and spacers, the walls are accordingly heated by the combustion gases which are seeded at high temperature. Consequently, said walls are also brought to a high temperature and are subject to all the exacting conditions mentioned above which are inherent to this type of operation.

Since the boundary layer of the gas stream is at a lower temperature in the vicinity of the walls, it would be possible to make use of simple or mixed oxides such as magnesia (MgO) or strontium zirconate ($SrZrO_3$) and calcium zirconate ($CaZrO_3$) at temperatures of the order of 2000° C. without thereby entailing any disadvantages (aside from the disadvantage of vaporization of MgO above 1700° C.) and over a long period of operation under the conditions of MHD conversion, provided that the electrical conductivity of these different materials does not exceed 1 mho./m. starting from 1650–1750° C. It is therefore essential to ensure that the faces of the refractory oxides are maintained in contact with the gases at an average temperature of approximately 1650–1700° C. This also prevents formation of liquefied seeding material, migration of this latter into the ceramic materials and resultant leakage currents.

With the above object in mind, the hot faces of the walls or refractory spacers must be partially cooled by mounting them against and anchoring them to metallic casings which have good electrical conductivity and are cooled by an internal circulation of water.

In the present invention, due consideration has been given to all the above-mentioned conditions which govern hot-wall operation. The structures employed ensure:

maintenance of the surface tempreature of refractory bricks in the vicinity of 1650/1700° C. in the case of thermal flux values which vary between 50 and 400 watts/cm.², the intrinsic electrical insulation of the constituent elements with respect to each other, good resistance to mechanical and thermal shock.

More specifically, the present invention is concerned with electrically and thermally insulating elements designed to perform the function of walls and electrode spacers for an MHD energy-conversion duct, comprising on the one hand a casing of heat-conducting material which is equipped with cooling passages and fitted on one face with metallic partitions and, on the other hand, bricks of dense electrically-insulating ceramic material which are fitted between said partitions and have dimensions of the same order in both directions at the frontal face which is subjected to the action of the hot gases, characterized in that said partitions extend within said passages, are anchored in said casing and progressively increase in width towards the frontal face so as to retain said bricks and in that said elements additionally comprise on the one hand a plate of ceramic insulating material which is subjacent to the bricks and provides a separation between said bricks and said casing and on the other hand sleeves of ceramic insulating material which provide a separation between said partitions and said casing.

Further characteristics and advantages of the present invention will become apparent from the following description which is given with reference to the accompanying drawings and in which two forms of construction of an insulating wall made up of the elements referred to are given by way of explanation but not in any limiting sense.

Figure 2:
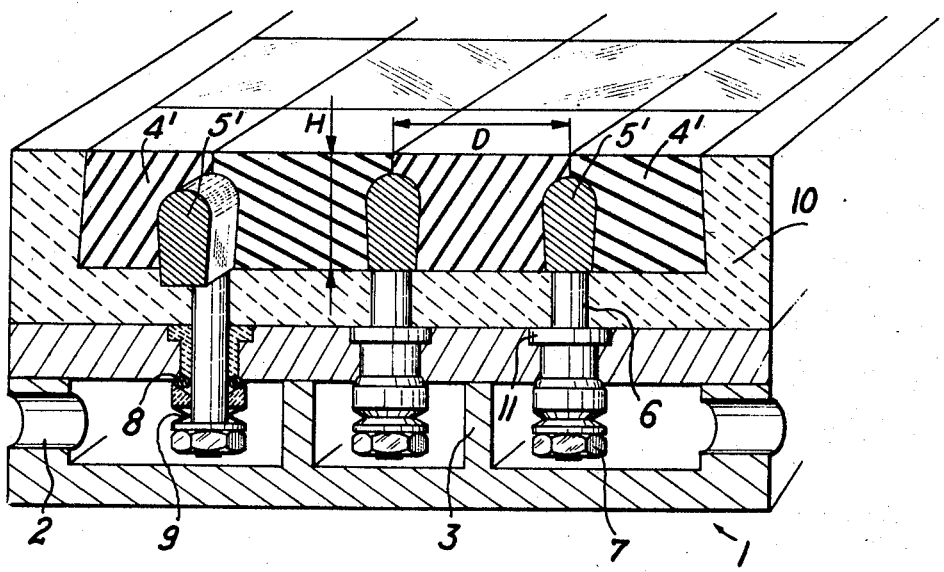

In the accompanying drawings, FIG. 1 is a cross-sectional view of an insulating wall in accordance with the present concept; and FIG. 2 is a view similar to that of FIG. 1 of another embodiment of the insulating wall herein.

This insulating wall comprises a casing 1 formed of conductive material (such as copper, for example) in which is formed a duct 2 for the circulation of cooling water. Staggered baffle-plates 3 are intended to provide more powerful cooling of the casing.

The bricks 4 and 4' as shown in transverse cross-section are insulating refractory elements of magnesia, strontium zirconate, or calcium zirconate and having at the frontal face which is subjected to the action of the hot gases either a square or slightly rectangular shape.

Cooling of the bricks is carried out laterally by means of metallic partitions 5 and 5' having a large number of cylindrical extremities such as the extremity 6, said extremities being immersed in the water which is circulated within the cooled metallic casing 1. Deep cooling of the bricks would be partacularly difficult to establish by reason of the very low thermal conductivity of insulating refractory ceramic materials and the very small thicknesses which would be entailed in the case of very high thermal fluxes. In fact, in the case of an industrial duct of 400 watts/cm.$^2$ of thermal flux, a thickness of 0.8 to 1 mm. of strontium zirconate would be the ultimate permissable limit.

Clamping nuts 7 associated with O-ring seals 8 formed of rubber (or plastic material) and metallic spring-washers 9 serve on the one hand to anchor said partitions to the casing and on the other hand to ensure imperviousness to the water.

The partitions employed can have different dimensions and shape; thus, in the embodiment of FIG. 1, said partitions are flush with the frontal face which is subjected to the action of the hot gases whereas, in the embodiment of FIG. 2, said partitions terminate in a rounded portion at a distance from said frontal face so that, in this second case, the bricks 4' are juxtaposed. But in all cases, the partitions have a shape in transverse cross-section which increases in width towards the frontal face, with the result that the bricks 4 and 4' are maintained firmly anchored in the casing.

The dimensions of the bricks (height H and side D) are governed by the intensity of the thermal flux which passes through the wall. If it is desired that the mean value of temperature of the hot face of the brick should be in the vicinity of 1650 to 1700° C., it is therefore necessary to ensure that D=16 mm. and H=12 mm. Bricks of this size are practically clamped in position by the metallic partitions 5 or 5' which are insensitive to thermal shock.

Electrical insulation between the different cooling partitions 5 and 5' is obtained on the one hand by means of a plate 10 of ceramic insulating material which is subjacent to the bricks 4 and 4' and provides a separation between said bricks and the cooling casing 1 and, on the other hand, by means of sleeves 11 which are also formed of ceramic material and surround the cylindrical portions of the partitions 5 and 5' at the points at which said cylindrical portions pass through the casing 1. The bending strength of the plate 10 is enhanced by said casing.

The arrangement which has just been described thus ensures adequate cooling of the bricks as well as electrical insulation between the cooling partitions and good resistance of the whole structure both to mechanical and thermal shock.

It is self-evident that the invention is not limited solely to the forms of construction which have been illustrated and described by way of explanation and that the scope of this patent extends to alternative forms of either all or part of the arrangements described which come within the definition of equivalent means as well as to any or all applications of such arrangements.

What I claim is:

1. Electrically and thermally insulating elements for walls and spacers of an MHD conversion duct, comprising on the one hand a casing of heat-conducting material which is equipped with cooling passages and fitted on one face with metallic partitions and on the other hand bricks of dense electrically-insulating ceramic material which are fitted between said partitions and have dimensions of the same order in both directions at the frontal face which is subjected to the action of the hot gases, wherein said partitions extend within said passages, are anchored in said casing, and progressively increase in width towards the frontal face so as to retain said bricks, and wherein said elements additionally comprise on the one hand a plate of ceramic insulating material which is subjacent to the bricks and provides a separation between said bricks and said casing and on the other hand sleeves of ceramic insulating material which provide a separation between said partitions and said casing.

2. Electrically and thermally insulating elements in accordance with claim 1, wherein the terminal portions of the partitions which extend into the cooling passages are of cylindrical configuration.

References Cited

UNITED STATES PATENTS

| | | | |
|---|---|---|---|
| 3,242,354 | 3/1966 | Novack et al. | 310—11 |
| 3,271,597 | 9/1966 | Way | 310—11 |
| 3,280,349 | 10/1966 | Brenner et al. | 310—11 |

DAVID X. SLINEY, Primary Examiner